Feb. 4, 1969 N. J. BOSE 3,426,346

MAGNETIC ENCODER

Filed Jan. 6, 1965 Sheet 1 of 7

INVENTOR.
NORMAN J. BOSE
BY Geo Seevers
ATTORNEY

Feb. 4, 1969 N. J. BOSE 3,426,346

MAGNETIC ENCODER

Filed Jan. 6, 1965 Sheet 5 of 7

United States Patent Office 3,426,346

Patented Feb. 4, 1969

3,426,346

MAGNETIC ENCODER

Norman J. Bose, North Hollywood, Calif., assignor to General Precision Systems Inc., a corporation of Delaware Filed Jan. 6, 1965, Ser. No. 423,676

U.S. Cl. 340—347 4 Claims

Int. Cl. H04l *3/00;* H03k *13/00, 13/07*

ABSTRACT OF THE DISCLOSURE

A size 11 magnetic encoder having three magnetized code discs packaged into a size 11 unit wherein the two outside read head supports are identical, but are mirror imaged face-to-face at opposite ends of the encoder. The two inside faces of the discs that are continuous in the center of the encoder are adjacent to and read by a singular read head assembly. The low speed disc is driven by an epicyclic gear train with a 64 to 1 reduction.

This invention relates to magnetic encoders, and more particularly to a novel and improved noncontact magnetic encoder.

Magnetic noncontact encoders inherently enjoy advantages over contact or brush encoders primarily because of the infinite "brush" and disc life and the high rotation speed not possible in the contact encoder. Heretofore, magnetic encoders have encountered problems of "readout" and definition; high noise-to-signal ratios; and weak readout signals and cross-talk between bits and tracks. Attempts to meet the ever increasing demands of both industry and the military for miniaturization, ruggedization and improvement relative to the above objections have placed demands on encoders, both contact and noncontact, and have met with very poor or no success in meeting these demands.

To be more specific, the present demand is for a size 11 thirteen-bit magnetic encoder. The size of the encoder is related to the diameter in inches and tenths of inches, e.g., a size 11 encoder is 1.1 inches in diameter; a size 8 is .8 inch; and a size 20 encoder is 2.0 inches in diameter, etc., and the bits are the number of concentric tracks.

Heretofore, the problems of building into one housing the discs, the gearing, readout coils, bearings, etc. necessary in miniaturized encoders have been insurmountable and unsuccessful. Attempts have been made to accomplish this by making all of the component parts relatively smaller. But it has been found that unacceptable sacrifices in a nonlinear ratio of definition, signal strength, and the like, have arisen. This has been particularly true in assembly and adjustment, whereby the cost of manufacture and adjustment has increased unrealistically beyond the point of advantage. The readout characteristics have decreased below acceptability and operability for the purpose intended. Also, it has been found that present noncontact encoders, both standard size and miniature, are costly and difficult to construct for stability and ruggedness. This is particularly true in shock and acceleration.

Applicant's invention has overcome the objections of heretofore known magnetic noncontact encoders. An encoder embodying this invention has been found to have markedly improved signal strength, noise-signal ratio, ruggedness and accuracy. At the same time it has proven to be less costly to build and check out. In actual practice it has also been found that a thirteen-bit size 11 magnetic encoder constructed in accordance with the teachings of applicant's invention, is less costly to build and is greatly improved in readout characteristics, and that not only no sacrifice of quality of capabilities is necessary but that over-all these have been actually improved in the smaller encoder over the large.

Briefly described, one preferred embodiment utilizing this invention comprises a thirteen-bit size 11 encoder having three discs which are magnetized in a binary V scan code. A frame encased in a cylindrical housing supports the code discs on a shaft. Said shaft is supported at either end with ball bearings. Core readout holders are mounted on the frame and means for adjusting the code discs within the frame are provided. The read cores are rigidly set in the frame and means for adjusting the frame to the disc permit spacing adjustment of the heads from the disc. Means are provided for angular adjustment of the slow speed disc in respect to the angular position of the high speed disc after complete assembly of the disc and brushes.

The invention will be more readily understood by reference to the following detailed description and accompanying drawings, wherein.

Figure 1:
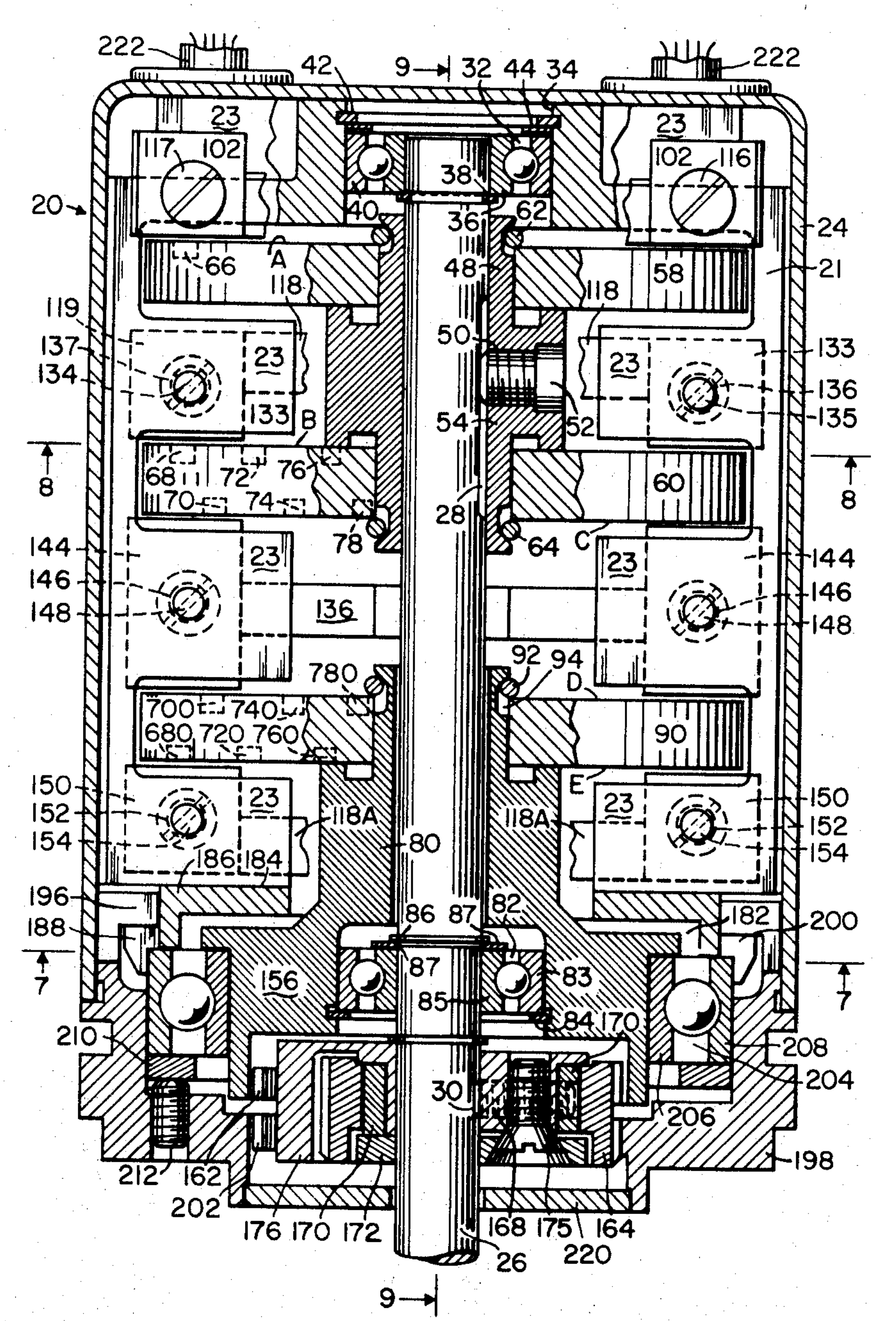
FIG. 1 shows a plan view, partially in section of the assembled encoder, illustrating one embodiment of this invention.

Turning now to a more detailed decription of the embodiment illustrating this invention in which like numerals refer to like parts, the numeral 20 designates generally the assembled encoder. The numeral 21 designates generally a frame, supporting both the rotating and stationary components of said encoder. Integrally located within frame 21 there are provided three recesses 22 formed by four divider segments 23, as best shown in FIG. 2. A case or cover 24 preferably encloses the working parts of the encoder, as illustrated in FIG. 1.

Figure 2:
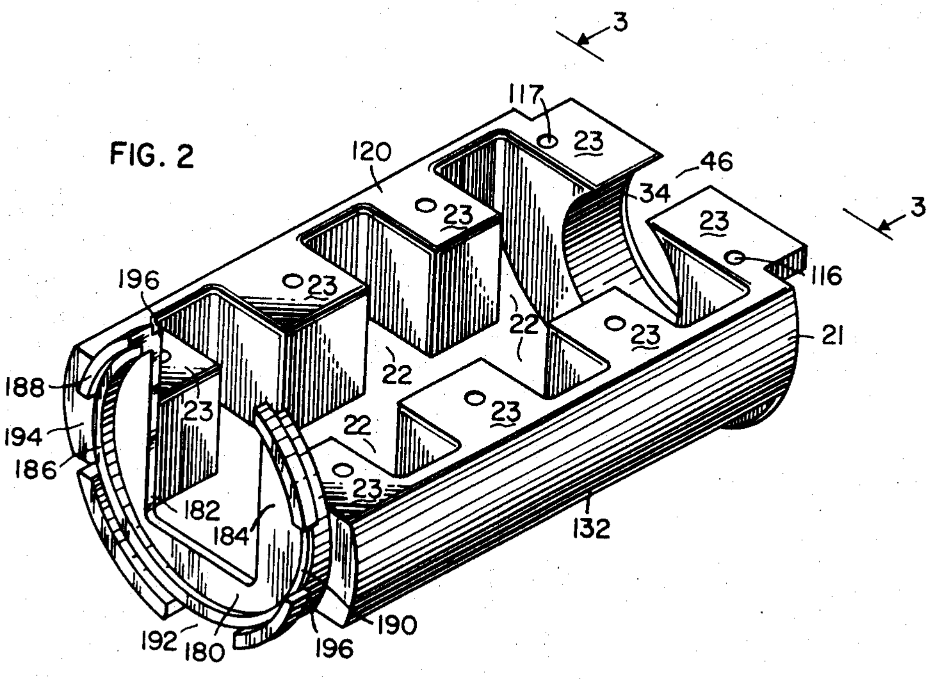
FIG. 2 shows a perspective view of the frame shown in FIG. 1.
Figure 3:
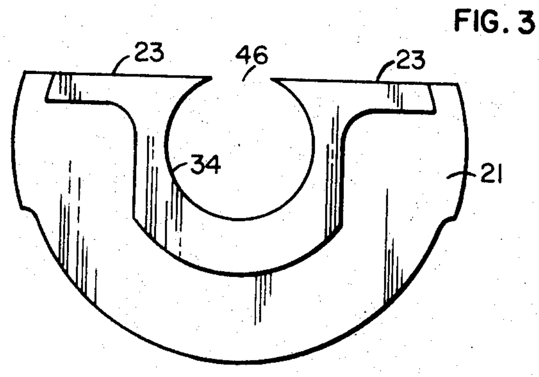
FIG. 3 shows an end view of the frame shown in FIG. 2, taken along the lines 3—3 of FIG. 2.

A shaft 26 is rotatably mounted in the frame 21, as shown in FIG. 1. Shaft 26 is provided with one elongated slot 28 adjacent the rear end of the encoder, and a second shorter, but also elongated, slot 30 is located adjacent the front end of the encoder, as more clearly shown in FIG. 8. A conventional ball bearing 32 supports the shaft 26 in frame 21 and is located in the opening 34 positioned at the rear end of the frame 21. The inner race 36 of ball bearing 32 is supported against lateral movement on shaft 26 by means of an external retaining ring 38, preferably of the E type, and the outer race 40 is retained in the frame 21 by means of an internal retaining ring 42. Disposed between the internal ring 42 and the outer race 40 of the bearing 32 is a shim or shims 44. The purpose and advantage of these particular shims will be described in more detail during the description of the assembly procedure of this encoder. It is to be noted here that a slot 46 is provided, as shown in FIG. 2, in the frame 21 to permit the end of the shaft 26 to drop therethrough into place for purpose of assembly, which will become apparent as the description proceeds. Adjustably mounted upon the shaft 26 is a high speed hub 48, as shown in FIG. 1. Hub 48 is locked to shaft 26 by means of a set screw 50 tightening into slot 28. An elongated slot 52 is milled into the high speed hub adjacent the set screw 50 opening, as shown in FIG. 1. The purpose of slot 52 will be explained later. Hub 48 is further provided with a milled collar 54 positioned intermediate the ends thereof, as shown.

Two high speed code discs 58 and 60 are carried upon each end of the high speed hub 48 and are locked in place thereon against the milled collar 54 by snap rings 62 and 64.

Disc 58 carries about its outer periphery the least significant digit track (LSD) 66. The segments of the LSD track 66 are written magnetically on disc 58 in any preferred manner. It should, however, be emphasized here that disc 58 carries only the LSD track 66 on one side thereof. For a more detailed description of the pattern and manner in which the magnetic segments are "written" and the pattern thereof on this particular disc, reference is made to my copending patent application, Ser. No. 423,675, filed Jan. 6, 1965, for Magnetic Analog-to-Digital Encoder and Method of Producing Same.

A low speed hub 80 is located on shaft 26 adjacent the end opposite the high speed hub 48. Hub 80 is shown in complete detail in FIG. 1 separate from the frame 21 and shaft 26. Hub 80 is rotatably supported on shaft 26 by means of a ball bearing 82. The outer race 83 of bearing 82 is locked to the hub 80 by means of an internal retaining ring 84, and the inner race 85 of the bearing 82 is locked to shaft 26 by means of an external E type retaining ring 86. Preferably, a shim 87 is set between the external retaining ring 86 and the inner race 85 of bearing 82 for longitudinal adjustment on the shaft.

Figure 9:
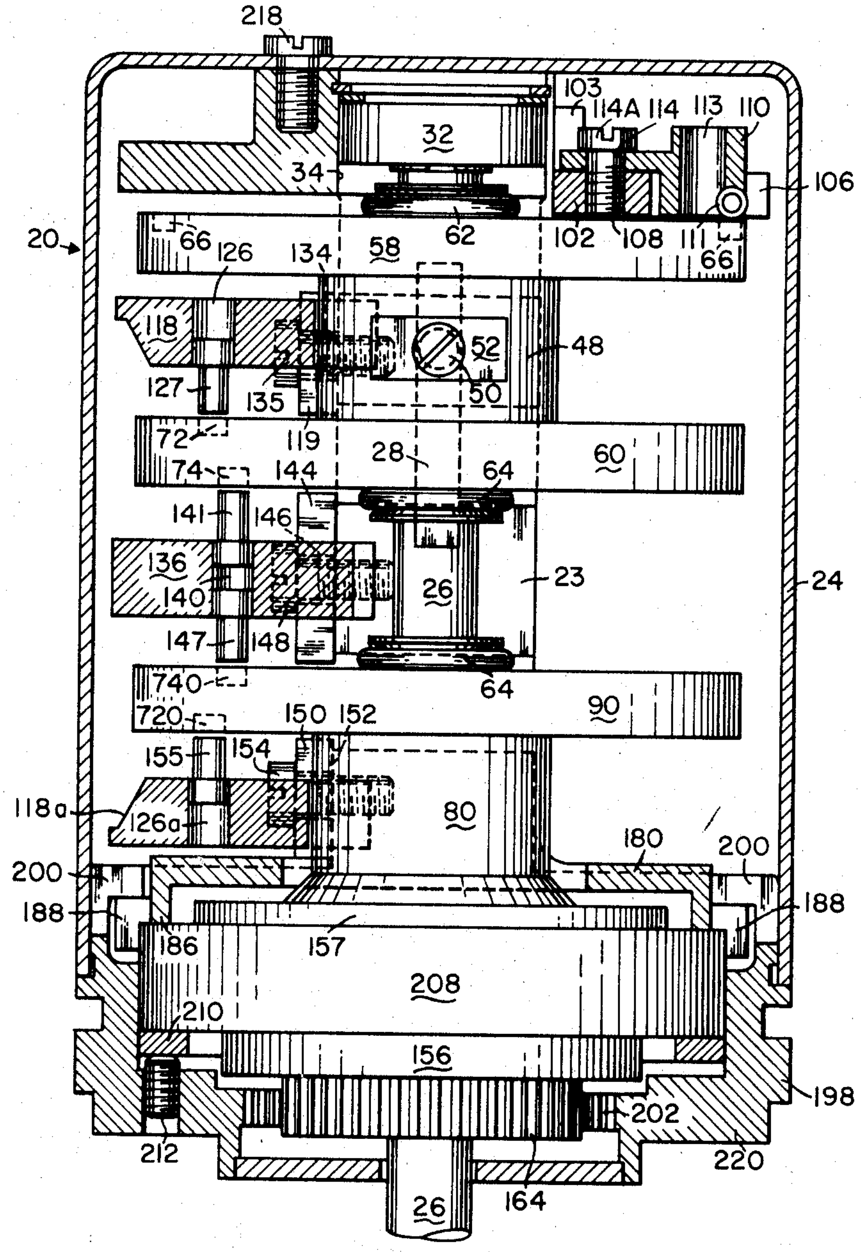
FIG. 9 is a longitudinal sectional view taken along the line 9—9 of FIG. 1.

A single collar 88 is provided on hub 80, as shown in FIGS. 1 and 9. A low speed converter disc 90 is mounted upon hub 80, as shown in FIG. 1, and is held against collar 88 thereon by means of a snap ring 92 located in annular recess 94.

Figure 10:
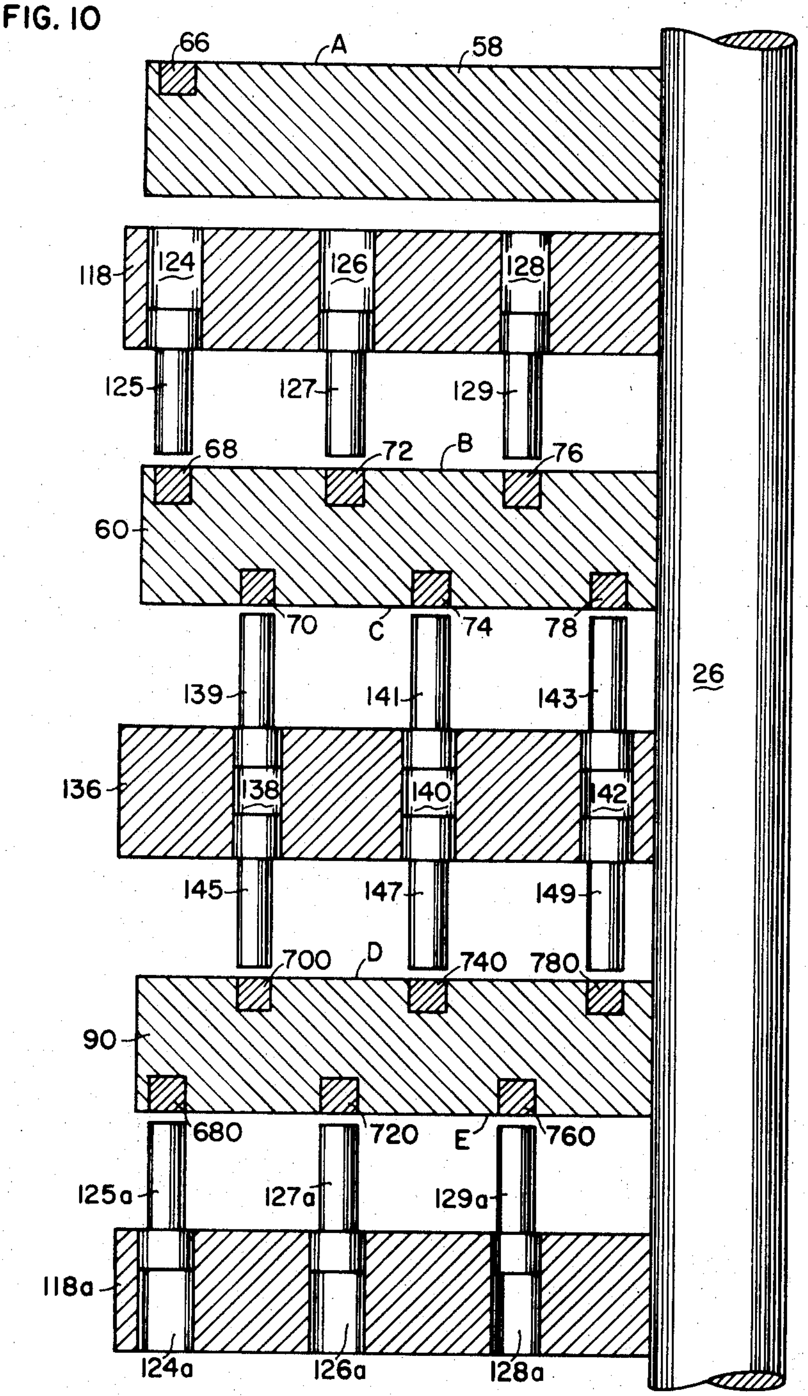
FIG. 10 is a schematic partial section view of FIG. 1 illustrating schematically the position of the core read heads and the tracks on the discs.

The next least significant digit track 68 (track 2) is written adjacent the periphery of disc 60 on the "outboard" face B of disc 60, as shown in FIG. 10. The next least significant digit track 70 (track 3) is written on the opposite surface C of disc 60 next adjacent the low speed gear hub 80 and is radially positioned inward toward the center of the disc 60, as shown in FIGS. 9 and 10. The next more significant digit track 72 (track 4) is located on the side of the disc 60 B as is the next least significant digit track 68, but is spaced radially inwardly two track widths therefrom. The next more significant digit track 74 (track 5) is located on the same side of disc 60, side C, as is track 70 but is disposed radially inwardly therefrom by two track widths. The next more significant digit track 76 (track 6) is located on the same side, side B, of the disc 60 as is track 68 but is located radially inwardly four track widths therefrom and is located two track widths inwardly from track 72. The most significant digit track 78 (track 7) is located on the same side of the disc 60, side C, as are tracks 70 and 74 but is located radially inwardly four track widths from track 70 and two track widths from track 74.

From the foregoing explanation, it will now be appreciated that disc 60 has written on both sides the next six more significant digit tracks on alternate sides thereof. When added to the LSD track written on disc 58, disc 60 completes, in this manner, a complete seven-bit readout member.

Low speed disc 90 is written in a code pattern identical with that of disc 60 with the exception that the disc is turned or rotated angularly on the shaft 180 degrees from the position of disc 60. That is to say, that this being a thirteen-bit encoder, the least significant digit track 680 (track 8) is written adjacent the circumference of disc 90 and is identical in position and pattern to track 68 of disc 60. The next track 700, or track 9, is located radially and is patterned identically with track 70 in disc 60; and track 720 (track 10) is located radially and patterned identical to track 72 of disc 60. Track 740 (track 11) is located radially and patterned identically to track 74 of disc 60. Track 760 (track 12) is located radially and patterned identically to track 76 of the disc 60. The most significant digit track 780 of disc 90 (track 13) is located radially and patterned identically to track 78.

At this point of the disclosure it will be obvious to those skilled in the art that there has now been provided on three discs: the least significant digit track on code disc 58, the next six most significant digit tracks on disc 60 and the least six most significant digit tracks on disc 90, making a thirteen-bit magnetic noncontact encoder.

Again, reference is made to the above copending patent application, Ser. No. 423,675 filed Jan. 6, 1965 for Magnetic Analog-to-Digital Encoder and Method of Producing Same, for a complete detailed description of the method of writing and a detailed description of the characteristics of the segments of these discs 70 and 90, which is used in the preferred embodiment of the invention, described herein, and which is described in no more detail here inasmuch as it forms no part of this invention and is unnecessary for a complete understanding of this invention.

Figure 8:
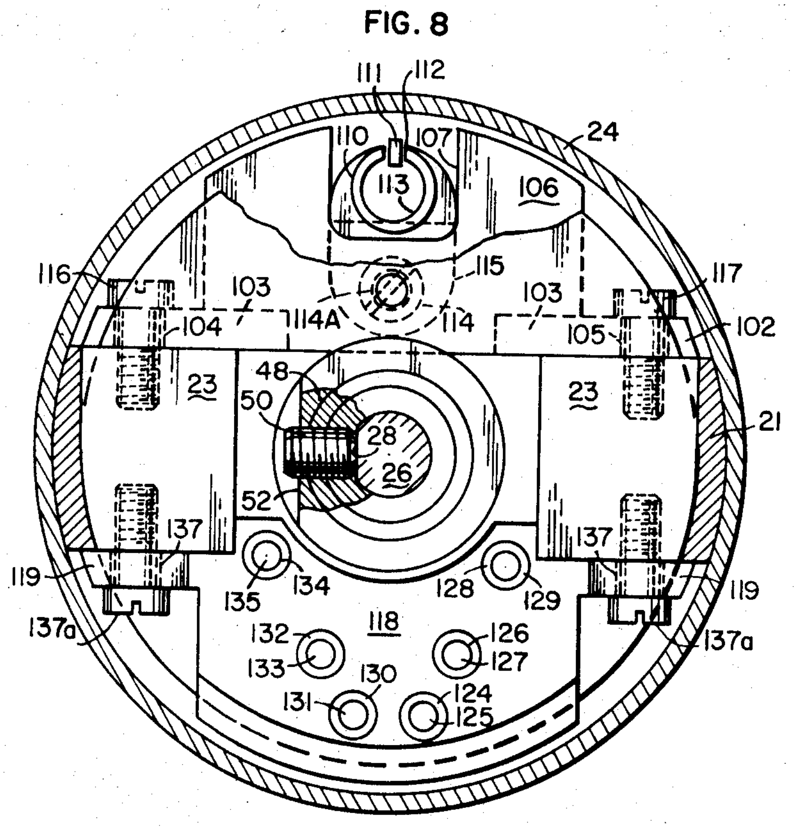
FIG. 8 is a sectional view taken along the lines 8—8 of FIG. 1.

Head core assembly support 102 for disc 58, shown in detail in FIGS. 8 and 9, is provided with two flanges 103. The flanges 103 are provided with non-tapped holes 104 and 105, respectively. An upright member 106 having a slot 107 formed therein and a hole 108 tapped therethrough is disposed substantially intermediate the flanges 103. Core head holder 110 for the LSD track 66, shown in detail in FIGS. 8 and 9, is provided with a slot 112 which receives a ferrite core head 111 of conventional design. A hole 113 is provided longitudinally through the body of the core holder 110. In addition to providing space for the core head 111, it also provides an outlet for the driver and read leads, not shown. A hole 114 is provided in the base 115 of the core head holder 110, as shown, through which a lock screw **114*a* is threaded into hole 108 which when tightened down, holds the core head holder 110 in the head assembly support 102, and is made larger than the lock screw 114*a*, as shown in FIG. 9, for the reason which will be explained in more detail later in the explanation of the adjustment of the assembled encoder. The head core assembly support 102 is mounted through holes 104 and 105 by means of screws 116 and 117 to frame 21, as shown in FIGS. 1 and 8. The holes 104 and 105 are made somewhat larger than screws 116 and 117**.

The head core assembly support for the second high speed disc 60 is designated by the numeral 118 and is shown in FIGS. 1, 9 and 10. In order to more clearly orient the location of the several head core assembly supports, the frame 21, as shown in FIG. 2, will be hereafter designated as having an upper surface or side, designated by the numeral 120, and an under surface or side, designated by the numeral 132. It will be observed from this point in FIGS. 8, 9 and 10 that the least significant digit track head core assembly support 102 is located on the upper surface 120 of frame 21; whereas, the core assembly support 118 is located on the opposite, or under surface 132, of said frame 21.

Core assembly support 118 is, in the embodiment of the invention illustrated here, provided with six holes FIG. 8, designated generally by the numerals 124, 126, 128 and 130, 132 and 134, respectively. Because of the necessity of skewing the disc pattern as well as the core heads in order to avoid interference, noise and cross-talk between the tracks, the segments in the tracks and the head or cores, the V scan code on the disc 60 is not apparent from the placement of the cores. Core assembly support 118 carries the leading and lagging read cores for tracks 68, 72 and 76, shown in FIGS. 1, 9 and 10. Holes 124, 126 and 128 carry the leading head cores 125, 127 and 129, respectively, and holes 130, 132 and 134 carry the lagging head cores 131, 133 and 135, respectively, as shown in FIG. 8. Core assembly support 118 is also provided with flanges 119. Each flange 119 is provided with a hole 137 into which is loosely fitted a screw **137*a* threadably set in frame 21**.

Head core assembly support 136 is, as will be seen from the study of the enlarged schematic showing of FIG. 10, a dual core head holder. Holes 138, 140 and 142 carry the leading cores 139, 141 and 143, which read tracks 3, 5 and 7, designated respectively by the numerals 70, 74 and 78 of disc 60, as is clearly shown in FIG. 10. At this point it will be appreciated that we have now accounted schematically for the disposition of the tracks and the leading brushes of all seven-bits of the first seven-bit of a thirteen-bit encoder but have omitted an actual showing of the location of the leading and lagging brushes for the sake of simplicity and understanding. The lagging brushes and their position in the holder, being a matter of selection and design depending upon the particular "skew" of the pattern of the disc, are shown only in FIG. 8 by way of illustration for the 2nd, 4th and 6th track located on face B of disc 60 and are not shown in the schematic illustration of FIG. 10, nor are lagging brushes represented for tracks 70, 74 and 78, namely tracks 3, 5 and 7 located on face C of disc 60.

In FIG. 10, to orient the location of the tracks, heads and holes, hole 126 is illustrated in core head holder 118 with core 127 in place over track 4, designated by the numeral 72. Core 141 in hole 140 is shown in approximate position over track 74 and core 143 located in hole 142 of head support 136 is shown in approximate position over track 78.

It will be here appreciated from a study of FIG. 10, and somewhat less so of FIG. 9, that core head holder 136 is a dual head holder holding heads for three tracks of disc 60 as well as disc 90, faces C and D, respectively. Core 145 is shown in hole 138 in approximate position over track 700 (track 8) located in face D of the low speed disc 90. Core 147 located in hole 140 is positioned approximately over track 740 (track 10) located in face D of disc 90; and core 149 is located in hole 142 approximately in position over track 780 (most significant track 13) in surface D of disc 90. It is believed that it will now be apparent that the pattern and track disposition of tracks 700, 740 and 780 on surface D of disc 90 and tracks 70, 74 and 78 on surface C of disc 60 are identical. For the purpose of clarity, it is again repeated that discs 60 and 90 are identical on surfaces B and E and surfaces C and D.

Head core assembly support 136 is provided with a pair of flanges 144, as shown in FIGS. 1 and 9, through which holes 146 have been drilled to receive screws 148 set into frame 21. Holes 146 are slightly larger than the shank of screws 148 to permit transverse and longitudinal adjustment of head holder 136 to permit adjustment.

Head core assembly support **118*a* is identical with head assembly support 118 with the exception that it is inverted 180 degrees facing toward surface C of disc 60, or axially turned over with surface D of disc 90 facing surface C of the disc 60, as is illustrated clearly in FIG. 10. Into hole 124*a* in head holder 118*a* there is inserted core 125*a* which is located approximately over track 680 (track 8) of disc 90. Core 127*a* is located in hole 126*a* of holder 118*a* and is located approximately over track 720, being track 10 of disc 90. Core 129*a* is inserted in hole 128*a* of holder 118*a* and is located approximately over track 760, being track 12 of disc 90. Core head holder 118*a* is provided with flanges 150 through which holes 152 are provided and are adapted to receive screws 154 which are set into frame 21 in comparable manner to screws 146 of head holder 136 and screws 135 of head holder 118. No electrical circuitry is shown or suggested for any of the heads described herein for the reason that they form no part of the invention and are entirely of conventional design. As a matter of practice in the embodiment of this invention, each core is of the doughnut type and contains a drive winding and a read winding, which by conventional desired wiring is lead by a typical harness through the case 24** to the outside of the encoder.

Inasmuch as discs 60 and 90 have identical magnetized pattern "written" on each disc, they are interchangeable and reduce the cost of the encoder. By the same token, core head holder **118*a* is identical to core head holder 118 with the exception that it is oriented axially 180 degrees from that of core head holder 118. A careful study of FIG. 10 will make this explanation more clear. By this token, the faces opposite each other of discs 60 and 70 (C and D) contain identical tracks and thereby can be read both leading and lagging by brushes in axial alignment. For example, brush 139 is in axial alignment with brush 145; brush 141 is in axial alignment with brush 147; and brush 143 is in axial alignment with brush 149. In core head holders 118 and 118*a*, being positioned face to face, core 125 and core 125*a* are in axial alignment; cores 127 and 127*a* are in axial alignment; and cores 129 and 129*a*** are in axial alignment. A further discussion and explanation of the advantages and purposes of this novel and unusual arrangement of the cores, the holders and the discs, will be explained in more detail in connection with the explanation of the parts assembly of this encoder, the parts assembly, being a very important novel feature embodied with the scope of this invention.

Figures 4, 5, 6:
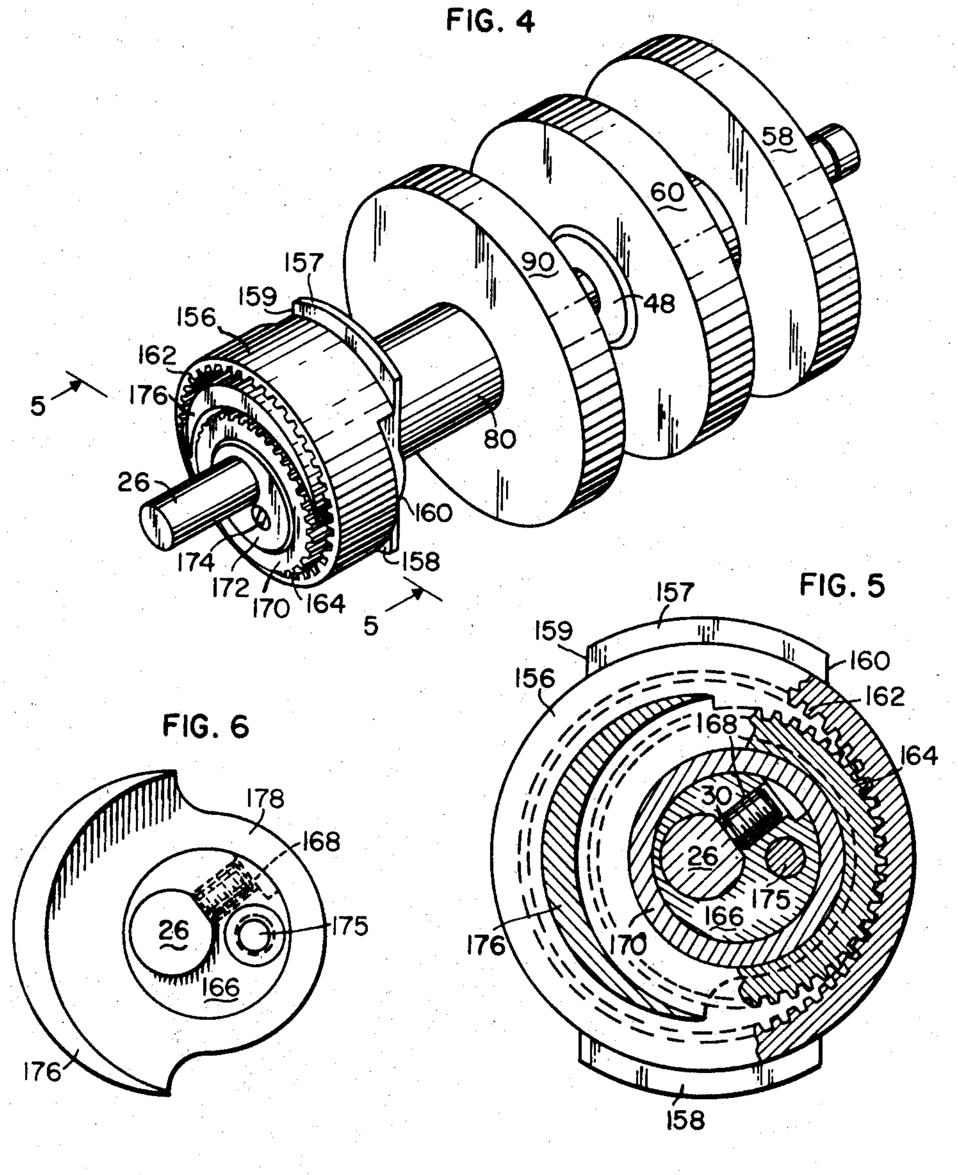
FIG. 4 shows a perspective view of the code discs, shaft and gear train removed from the frame.
FIG. 5 shows an enlarged end view of the epicyclic gear train and counter balance.
FIG. 6 shows a detailed plan view of the counter balance, shown in FIG. 5.

Returning now to a further detailed description of low speed hub 80 and the gearing drive for the low speed disc 90, reference is made to FIGS. 1, 4 and 9. The low speed gear hub 80 is preferably made in one piece with a housing 156, as shown in FIG. 4. Said housing 156 has a pair of outwardly extending flanges 157 and 158 having the sides thereof 159 and 160 milled parallel, as shown in FIG. 4, with the milling extending slightly into the adjacent housing 156, as clearly shown in FIG. 4.

Internally of housing 156 is an internal gear 162, which in the preferred embodiment of this invention, shown and described herein, contains 64 teeth, which form one-half of the housing of an epicyclic gear reduction box. Located within the housing 156 and mounted upon shaft 26 is a rotary idler gear 164 of conventional design. The gear 164 is mounted upon eccentric hub 166, which is locked onto shaft 26 by means of a screw 168. The idler gear 164 is separated from the hub 166 by means of a steel, or the like, ring 170. Gear 164 and ring 170 are held on hub 166 by means of a cover plate 172, which, in turn, is held in place on hub 166 by means of a screw 174 threaded into hole 175 in said hub 166.

The idler gear 164 and hub 166, being normally in a condition out of balance, extreme vibration conditions are experienced if the reduction gear is driven at high speeds. Inasmuch as conventional uses for a noncontact encoder run as high as 10,000 r.p.m., the problem of vibration dampening becomes critical in the particular embodiment specifically described herein. In order to overcome the unbalance of the idler gear 164 and hub 166, a counterbalance 176, as shown in FIG. 6, is milled integrally with the eccentric hub 166. The hub 166 is annularly spaced from counterbalance 176 by a raceway 178 into which the idler gear 164 and the ring 170 fit. As is conventional in epicyclic gearing, the gear 164 turns freely on the ring 170, which, in turn, also turns freely on the eccentric hub 166. Inasmuch as the counterbalance 176 is positioned 180 degrees radially opposite the eccentric hub 166, as shown clearly in FIG. 6, the counterbalance 176 is always in its cycle of rotation position 180 degrees radially opposite the greater mass of the hub 166 and it attending mass of gear 164 and ring 170. To further facilitate the counterbalancing of gear 164, the milled elongated slot 52 located in high speed hub 48 is positioned 180 degrees radially from counterbalance 176 in order that the greater mass of 48 is positioned radially on shaft 26 in the same position as is counterbalance 176. Slot 52 being located in the open end of frame 21, minor balancing adjustment of the counterbalance 176 is possible after assembly by increasing the size of slot 52 or decreasing mass of hub 48.

Referring now to FIG. 2, the frame 21 is provided with an annular plate 180, and in the preferred embodiment described herein, the plate 180 is milled integrally with the frame 21. Plate 180 is provided with a rectangular opening 182, as shown in FIG. 2. Plate 180 is also provided with a face 184. A recessed annular ring 186 is surrounded by an upright collar 188, which is interrupted by opening 182 and also 190, 192 and 194. Collar 188 is spaced outwardly from the lateral sides of frame 21 by means of a step 196. This forms the female portion of a bayonet joint for cap 198.

Figure 7:
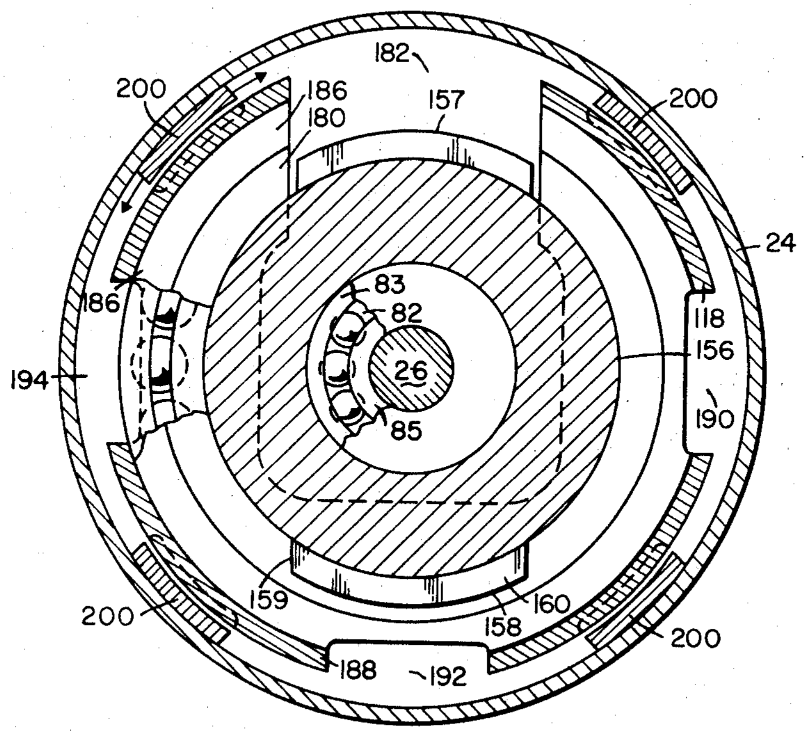
FIG. 7 shows an end plan view, partially in section of the gear train system housing taken along the lines 7—7 of FIG. 1.

Cap 198 is provided with interrupted mating lips 200 which mate with the collar 188 under step 196 to lock the bayonet joint, as more clearly shown in FIG. 7. Cap 198 is provided with internal teeth 202, which have one tooth more or one tooth less than the internal gear teeth 162, depending upon the direction of rotation desired at the output of the gear transmission. In the particular embodiment described herein, it being desired to turn the slow speed disc 90 in the opposite direction to the high speed discs 58 and 60, the gear teeth 202 being stationary because of their location in the cap 198, would have 64 teeth and the gear 162 would have 63 teeth. A ball bearing 204 has its inner race 206 supporting the outer surface of housing 156 and outer race 208 is fitted inside of cap 198, as shown. Also, it is pointed out that the outer race 208 of ball bearing 204 fits down against the raised annular ring 186, as shown in FIG. 1. A ring plate 210 bears against the other side of outer race 208 and a set screw 212 in cap 198, when tightened down against ring plate 210, locks ball bearing 204 and cap 198 against rotation. Preferably there are provided four set screws 212 circumferentially disposed about the cap 198. The setting of the set screws 212 also locks cap 198 in place against rotation.

*Assembly*

The manner in which the several parts of the encoder embodying this invention are assembled, being of considerable importance, are made possible as a result of the invention embodied therein. It is believed that a brief detailed description of the manner in which the parts of this encoder are assembled will assist the reader in the understanding of the invention.

The first step of assembly is to mount the low speed hub 80 on shaft 26, the E type external retaining ring 86 having first been locked on shaft 26, and the slow speed hub slid down on the shaft 26 from the opposite end. Shim 87 is then inserted against the retaining ring 86 and ball bearing 82 is then placed over shaft 26 and locked into place in hub 80 by means of the internal retaining ring 84, as shown in FIG. 1. Eccentric hub 166 is next placed over shaft 26 and is locked into place by means of set screw 168 mating in elongated slot 30. It is to be here noted that elongated slot 30 permits a slight longitudinal adjustment of eccentric hub 166 for spacing of the hub by means of shim 87. After eccentric hub 166 has been locked on shaft 26, gear 164 is placed over hub 166 and ring 170 is then inserted between the inner surface of epicyclic rotary gear 164 and eccentric hub 166. Holding this assembly together is plate 172, which is locked into place with set screw 174 placed in hole 175.

Next, the slow speed disc 90 is locked into place on hub 80 by means of ring 64. High speed discs 58 and 60 are then locked into place on hub 48 by means of snap rings 62 and 64. It is here to be understood that the magnetized code pattern has previously been "written" onto discs 58, 60 and 90 in a conventional manner and forms no part of this invention and bears no further description other than that previously referred to. A rough preliminary orientation of the discs is very simply made by spotting the zero position of the tracks. Following this step, hub 48, with high speed code discs 58 and 60 locked thereon, is placed on shaft 26 and is tentatively longitudinally held in place by means of set screw 50. The shaft and its assembled parts is now ready to be placed in frame 21. It is believed that it will be apparent that at this step the slow speed disc 90 and the high speed discs 58 and 60 are in approximate clearance position in the recesses 17 with approximate clearance between the core head support blocks 18.

Side shoulders 159 and 160, provided on extending flanges 157 and 158, are then oriented to be parallel to the sides of the rectangular opening 182. Hub 80 is then inserted into opening 182 and shaft 26 is dropped through opening 46 with discs 90, 60 and 58 dropping into place in opening 17. The bayonet joint formed by the male lips 200 are then rotated about 10 to 15 degrees in back of collar 188 forming the female lock of the completed bayonet joint or coupling, and set screw 212 is tentatively tightened to hold the assembled hub and gear box into frame 21.

Next, external retaining ring 38 is placed on shaft 26, as shown in FIG. 1, and ball bearing 32 is placed on shaft 26 with the inner race 36 of ball bearing 32 butted against the external retaining ring 38. Next, shim 44, of a desired thickness, is placed against the outer race 40 of ball bearing 46 and this assembly is locked into opening 34 in frame 21 by means of a second internal retaining ring 42. Following this step, code discs 58 and 60 are positioned longitudinally equidistant between blocks 18 after set screw 50 has been loosened. Set screw 50 is then locked tight and the assembly of the moving portions of the encoder are completely adjusted and set in the frame. It is believed that it will be seen from the explanation up to this point, that no further adjustment of the moving parts in this encoder will hereinafter be necessary, inasmuch as the gear reduction box, shaft 26, the code discs 58, 60 and 90 are all locked in place for free rotation. At this point, if desired, the counterbalancing of shaft 26 can be completed at this step by the previously described method.

The next step in the assembly and operation of the encoder embodying this invention is to pot the ferrite cores, which have first been wound with the desired drive windings and read windings into the core support holes of core assembly supports 118, 136 and 118*a*. As is conventional, it is contemplated in this disclosure and as was used in the embodiment described herein, the cores, being ferrite, are positioned approximately flush with the two surfaces of the flanges 119, 144 and 150 of core supports 118, 136 and 118*a*, respectively. After the potting has set, the cores in each of the assembly are then lapped flush with the contiguous surface of the flanges 119, 144 and 150.

Next, the flanges are tentatively set in place by means of the retaining screws. The lapped surfaces of the flanges are then moved into the adjacent surface of the code discs against a shim of preselected thickness. In the preferred embodiment of this invention, described herein, .013 shims were used as feeler gauges. After the lapped surfaces of the flanges are gauged by means of the preselected shim and spaced from the code discs, the head core assembly supports are each rigidly and firmly locked in place by means of the set screws. The cores, having been lapped flush with the surfaces of the flanges, are then automatically and rapidly spaced the desired distance from the code discs. For example, in the case of the preferred embodiment, described in detail, the cores, all in four simple convenient and quick adjustments, are spaced exactly .013 inch from the surface of the code discs. Head core assembly support 102 for the least significant track, being the single exception in this procedure, is also lapped flush with the entire assembled supports 115 and 102. Next, the same procedure in spacing core 111 from the least significant digit track of code disc 58 is followed by a feeler shim, followed by the setting of set screws 117 and 116, the same as in the case of the other head core assembly supports.

The core 111 is radially and angularly aligned by loosening screw 114*a* and pivoting or swinging head 110 about the axis of shaft 26 and then retightening screw 114*a*. The next and final assembly and also adjustment is then made by placing the entire encoder on an oscilloscope and reading the position of the tracks of the two high speed discs 58 and 60, as well as the tracks of the low speed disc 90. The high speed discs 58 and 60, having been angularly aligned before being locked onto the high speed hub 48, the set screw 212 is loosened and the cap 198 is then turned angularly either clockwise or counterclockwise while the scope is read until the slow speed code disc 90 is brought into angular alignment with the high speed discs 58 and 60. After the angular alignment between disc 90 and discs 58 and 60 is read on a scope, set screw 212 is then locked in place and cap 198 is then firmly held in the frame. The slow speed disc 90 is thus locked in alignment and the entire encoder is completely assembled and properly aligned.

After final assembly, the case 24 is then placed over the frame 21 and is locked in place by means of screw 218, and plate 220 is then pressed in place, which provides a dust seal for the encoder. Obviously, if desired, an airtight seal could be placed in plate 220 around shaft 26 and the encoder, being assembled in a dust-free room, would be almost 100% insensitive to dust and moisture. The read and drive windings of the ferrite cores are led out through the cover 24 in a conventional manner through grommets 222.

*Operation*

It is felt that the operation of the encoder embodying this invention is conventional and well-known in the art and that any detailed explanation thereof will be more than redundant. Furthermore, it is believed that the actual operation of the invention, described and taught herein, actually lies in the structure and in the simplicity of the assembly and adjustment, together with the attendant reduction in labor, and the increase in accuracy and correctness of the assembled encoder to be inherent and self-evident in the detailed explanation of the assembly steps taught under the heading "Assembly."

It is to be understood that no effort has been made to complicate the description and explanation of this encoder by showing or referring to electrical circuitry or electrical connections of the read cores, this being conventional and well-known in the art and forming no part of this invention.

It is to be understood that various changes in material, gear ratios, type of cores used, etc., may be resorted to without departing from the spirit of this invention, as set forth in the following claims.

I claim:

1. A magnetic encoder comprising:

(A) a plurality of encoder discs having a least significant digit track written only on one side of one disc;

(B) a frame rotatably supporting said discs therein;

(C) gear reduction means adapted to rotate one of said discs at a speed slower than the remainder of said discs;

(D) core read head supports disposed adjacent to the surfaces of said discs, at least two of said head supports being identical to each other;

(E) a second head support disposed between and adjacent to the contiguous surfaces of two of said discs, said second head having coaxially aligned common head core holders positioned to read each surface of said discs; and (F) adjusting means associated with said gear reduction means permitting angular adjustment of the position of the disc rotated by said gear reduction means in respect to the angular position of the other of said discs.

2. A magnetic encoder, according to claim 1, in which there is a shaft mounting said discs and adjusting means on said shaft associated with two of said discs permitting lateral adjustment of said discs along said shaft whereby said discs can be laterally adjusted in respect to said frame after said shaft and said discs are placed in said frame.

3. A magnetic encoder comprising:

(A) a frame;

(B) a shaft mounted in said frame;

(C) a first hub longitudinally adjustably mounted on said shaft;

(D) a pair of high speed code discs mounted on said hub;

(E) a second hub rotatably mounted on said shaft;

(F) an epicyclic gear reduction system mounted within said second hub and connected to said shaft;

(G) a low speed code disc mounted on said second hub;

(H) core read head supports disposed adjacent to the surfaces of said code discs, at least two of said head supports being identical to each other;

(I) a third head support disposed between and adjacent to contiguous surfaces of two of said discs, said third head support having coaxially aligned common head core holders positioned to read each surface of said two discs.

(J) a rotatable cap on said epicyclic gear having internal teeth therein forming a part of said gear; and (K) locking means permitting independent angular adjustable rotation of said cap to angularly align said low speed disc on said second hub in respect to the angular position of said high speed discs.

4. A magnetic encoder comprising:

(A) a frame having slots in both ends thereof;

(B) a rotatable shaft having a bearing rotatably supporting one end thereof and mounted in a first one of said slots;

(C) a first high speed hub on said shaft having means permitting longitudinally adjustably mounting of said hub on said shaft and a counterbalance slot therein;

(D) a pair of high speed code discs having a magnetic digital code pattern provided on the surface of each of said discs;

(E) a low speed second hub rotatably mounted within said frame;

(F) a second bearing on said shaft rotatably mounted one one end of said shaft and within said low speed hub;

(G) a low speed code disc having a magnetic digital code pattern on the surface thereof mounted on said low speed hub;

(H) a housing integral with said low speed second hub having internal gear teeth therein forming one part of an epicyclic gear train.

(I) an eccentric hub in said housing having means for locking said eccentric hub onto said shaft;

(J) an idler gear on said eccentric hub coacting with said internal teeth;

(K) a bearing rotatably mounting said housing in said frame;

(L) a pair of flanges on said housing adapted to slide through the slot in one end of said frame and to lock said housing into said frame when the flanges are rotated 90 degrees;

(M) a cap mounted on said frame having internal gear teeth coacting with said idler gear to complete the epicyclic gear train whereby the speed of said low speed code disc is reduced below the speed of said shaft;

(N) means on said cap to angularly adjust and lock said cap to said frame whereby the angular relative position of the low speed disc can be adjusted in respect to the high speed discs;

(O) core read head supports disposed adjacent to the surfaces of said discs, at least two of said head supports being identical to each other; and (P) a third head support disposed between and adjacent to the contiguous surfaces of two of said discs, said third head support having coaxially aligned common head core holders positioned to read one surface of each of two of said discs.

References Cited

UNITED STATES PATENTS 2,859,432 11/1958 Spaulding ........... 340—347

3,163,858 12/1964 Kirr ............... 340—347
3,226,711 12/1965 Lautzenhiser ........ 340—347

MAYNARD R. WILBUR, *Primary Examiner.*

J. GLASSMAN, *Assistant Examiner.*

U.S. Cl. X.R.

340—357